United States Patent
Asghar Akbary Balaei

(10) Patent No.: US 8,540,321 B2
(45) Date of Patent: Sep. 24, 2013

(54) SYSTEM FOR REDUCING FRICTION IN AUTOMOBILES AND MACHINERIES

(76) Inventor: Asghar Asghar Akbary Balaei, Karaj (IR)

(*) Notice: Subject to any disclaimer, the term of this patent is extended or adjusted under 35 U.S.C. 154(b) by 394 days.

(21) Appl. No.: 12/843,030

(22) Filed: Jul. 25, 2010

(65) Prior Publication Data

US 2010/0283313 A1    Nov. 11, 2010

Related U.S. Application Data

(60) Provisional application No. 61/302,180, filed on Feb. 8, 2010.

(51) Int. Cl.
*B60B 15/02* (2006.01)

(52) U.S. Cl.
USPC ............................................ 301/48; 301/44.1

(58) Field of Classification Search
USPC ............... 301/41.1, 43, 44.1, 44.4, 45–47, 301/51

See application file for complete search history.

(56) References Cited

U.S. PATENT DOCUMENTS

| | | | | |
|---|---|---|---|---|
| 1,149,305 A * | 8/1915 | Tautphaeus | ...................... | 301/49 |
| 2,094,425 A * | 9/1937 | Cook | ............................... | 301/49 |
| 2,924,486 A * | 2/1960 | Blaschke | ......................... | 301/48 |
| 3,016,270 A * | 1/1962 | Tucker, Sr. | ...................... | 301/48 |
| 3,239,277 A * | 3/1966 | Beck | ............................... | 301/47 |
| 4,154,488 A * | 5/1979 | Svensson et al. | ............. | 305/157 |
| 5,029,945 A * | 7/1991 | Kidwell et al. | ................. | 301/49 |

* cited by examiner

*Primary Examiner* — Jason Bellinger
(74) *Attorney, Agent, or Firm* — Barry Choobin; Patent360 LLC

(57) ABSTRACT

The various embodiments herein provide a system for reducing friction in vehicles operating on agricultural and muddy lands. The system includes a polous placed on a board fastened to the circular base, an arched piece connected one shaft in each of the two hydraulic jacks attached to the board, a plurality of bushings fastened to a wheel ring attached to the polous, a rotating helm attached to one end of a bushing shaft attached to each of the bushings, a guide bar attached to the bushings and bushings shaft and a spring arranged over the guide bar. The movement of the vehicle wheel causes the rotating helm to come in to contact with the arched piece which in turn stroke the bushing shaft resulting in a reciprocal movement inside the bushings thereby providing traction between the vehicle wheel and a land surface.

15 Claims, 7 Drawing Sheets

SYSTEM FOR REDUCING FRICTION IN AUTOMOBILES AND MACHINERIES

CROSS-REFERENCE TO RELATED APPLICATIONS

This application claims the benefit of Provisional Application No. 61/302,180 filed Feb. 8, 2010.

BACKGROUND

1. Technical Field

The embodiments herein generally relate to a system and method for reducing friction and particularly to a system and method for reducing friction in the automobiles and machineries to optimize an efficiency and functioning. The embodiments herein more particularly relate to a system and method for reducing a friction in the vehicles operating in the agricultural farm lands, the swampy lands, the muddy roads and the deserts for increasing traction to the tires.

2. Description of the Related Art

Often a driver riding a vehicle on the agricultural lands, the swampy lands and the deserts comes across various difficulties such as the wheels getting stuck in the mud resulting in an overheating of the engines. Further, driving the vehicle on the agricultural lands, the swampy lands and the deserts increases the risk of skidding of the tires due to which the driver loses the control over the vehicle which causes a delay in the work.

Presently the problem of a tire getting stuck in the mud is prevented by using the chains over the wheels, attaching a gripping device on the outer layer of tire or by providing the more rigid cut patterns over the tire.

The tire chains and the gripping device are manually installed over the wheels of the vehicle wherein the tires with rigid cut patterns are factory stock tires. The person installing the tire chains and the gripping device should have a required skill and experience to install the tire chains and a clamping device perfectly. The tire chains are tied around the wheel hub whereas the gripping device is clamped over the tire of the vehicles using the mechanical clamps.

These conventional methods however exhibit several disadvantages. The tire chain is installed using a woven fabric straps which absorb water, freeze and become stiff and thick during a use whereas the gripping device installed using the mechanical clamps which is heavy and causes friction when maneuvering over a normal land. The rigid cut pattern tires are the heavy tires which can only be installed in the heavy work load locomotives such as tractors, tippers and cranes. As a result, when the driver drives the vehicles using any of these devices on a normal road faces difficulty such as a decrease in speed, pick up, an imbalance of the tires and a more fuel consumption by the vehicle. Further the traction provided by any of the above mentioned prior art devices is constant and cannot be varied according to a user requirement. Moreover the entire operation is manual which is tedious and time consuming.

Hence there is a need to provide a system to improve the traction of the wheel. There also exits a need to vary the traction of the wheel dynamically according to user requirements.

The abovementioned shortcomings, disadvantages and problems are addressed herein and which will be understood by reading and studying the following specification.

OBJECTS OF THE EMBODIMENTS

The primary object of the embodiments herein is to provide a traction system for the vehicles to generate the maximum friction in the required time.

Another object of the embodiments herein is to provide a traction system for the vehicles which controls the quantity and scale of the friction.

Another object of the embodiments herein is to provide a traction system for the vehicles which varies the friction dynamically according to the user requirements.

Yet another object of the embodiments herein is to provide a traction system for the vehicles which reduces the number of wheels required to provide the traction for a vehicle movement.

Yet another object of the embodiments herein is to provide a traction system for the vehicles which minimizes a differential in the vehicles with multiple differentials.

Yet another object of the embodiments herein is to provide a traction system for the vehicles which reduces the manufacturing cost of the vehicles.

Yet another object of the embodiments herein is to provide a traction system for the vehicles which minimizes both an idle driving and an erosion of a tire caused due to the idle driving.

Yet another object of the embodiments herein is to provide a traction system for the vehicles which reduces the maintenance expenses of the vehicles.

These and other objects and advantages of the present embodiments will become readily apparent from the following detailed description taken in conjunction with the accompanying drawings.

SUMMARY

The various embodiments of the present disclosure provide a traction system for the vehicles which is used on the soft soil lands such as the agricultural lands. The traction system including a circular base, a board fastened to the circular base, an axle rod placed on the board, at least two hydraulic jacks fastened to the board, at least one shaft attached to each of the hydraulic jacks, an arched piece connected to the at least one shaft, a wheel ring attached to the axle rod, a plurality of bushings fastened to the wheel ring, a bushing shaft attached to each of the plurality of bushings, a rotating helm attached to end of the bushing shaft, a guide bar attached to the bushings and bushings shaft and a spring arranged over the guide bar between the bushings and the bushing shaft wherein the movement of the vehicle wheel causes the rotating helm to come in contact with the arched piece which in turn actuates the bushing shaft resulting in the reciprocal movements inside the plurality of bushings thereby providing a traction between the wheel and the surface.

The traction system is installed on the inner side of the vehicle's wheel which further comprises an outer shell enclosing the axle rod, wherein the outer shell of the axle rod forms a fixed section and the axle rod forms a dynamic section of the vehicle's wheel. The circular base, the board, at least two hydraulic jacks, the reinforcement pipe of the jacks and the arched piece are arranged on the fixed section of the vehicle's wheel wherein the wheel ring, the bushings, the bushing shaft, the rotating helm, the guide bar and the spring are arranged on the dynamic section of the vehicle's wheel and the bushing shaft is arranged vertically or inclined to a land surface. Further, the circular base is connected to at least one shaft of the hydraulic jack and the wheel ring and the number of bushing shafts to which the rotating helm is installed varies from 4 to 12. The circular base has a radius which is less than the radius of the vehicle wheel. Further, the board is a base plate for the axle rod and the at least two hydraulic jacks and at least one hydraulic pump is connected to the vehicle engine to provide a power to the hydraulic jacks wherein the hydraulic pump is controlled by at least one of a vehicle operator or an intelligent system. The system further comprises a plurality of reinforcement pipes for jacks wherein the plurality of reinforcement pipes is connected to a control valve and the hydraulic pump. Further the spring on the guide bar gets uncompressed when the vehicle wheel rotates and the rotating helm crosses the arched piece thereby pulling back the bushing shaft to an original position.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of herein provide a traction system for vehicles that maneuver on a loose soil such as the agricultural lands. The traction system including a circular base, a board fastened over the circular base, an axle rod placed on the board, at least two hydraulic jack fastened to the board, at least one shaft attached to each of the at least two hydraulic jacks, an arched piece connected to at least one shaft forming the fixed section of the traction system. Further a wheel ring is attached to the axle rod, a plurality of the bushings fastened to the wheel ring, a bushing shaft attached to each of the plurality of bushings, a rotating helm attached to an end of the bushing shaft, a guide bar attached to the bushings and a shaft of the bushings and a spring over the guide bar between the bushings and the shaft forming a dynamic section of the traction system. A hydraulic pump attached to the vehicle activates the hydraulic jacks and a driver of a vehicle manually decides the traction by adjusting a length of the shaft of the hydraulic jacks through a hydraulic pump. Also one or more reinforcement pipes of the hydraulic jacks are connected to the control valve and the hydraulic pump. When the vehicle starts moving, the dynamic section of the traction system moves in conjunction with the vehicles wheel. The rotating helm which is placed over the bushing shaft guides over the arched piece of the fixed section thereby pushing the bushing shaft towards the land surface and creating a traction for the vehicles movement.

Figure 1:
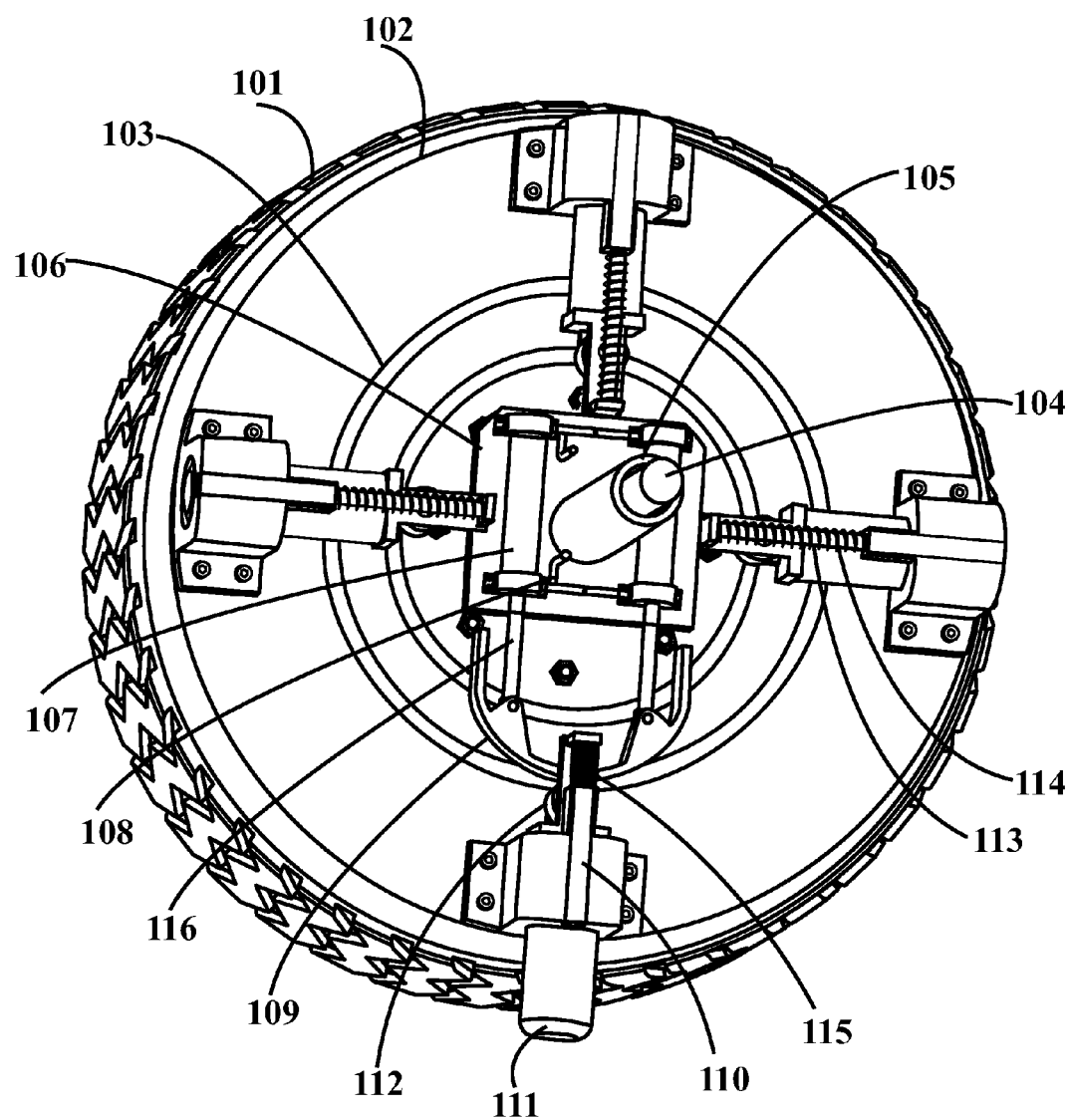
FIG. 1 illustrates a side perspective view of a traction system installed in the vehicles according to one embodiment.

FIG. 1 illustrates a side perspective view of a traction system installed in the vehicles according to one embodiment. The traction system includes a circular base 103, a board 106 fastened over the circular base 103, an axle rod 104 placed on the board 106, at least two hydraulic jacks 107 fastened to the board 106, at least one shaft 116 attached to each of the at least two hydraulic jacks 107, an arched piece 109 connected to one of the at least one shaft 116 forms the fixed section of the of the traction system. Further, the dynamic section of the traction system includes a wheel ring 102 attached to the axle rod 104, a plurality of bushings 110 fastened to the wheel ring 102, a bushing shaft 111 attached to the plurality of bushings 110, a rotating helm 112 attached to one end of the bushing shaft 111, a guide bar 113 attached to the bushings 110 and a shaft of the bushings 111 and a 114 spring is placed over the guide bar 113 is placed between the bushings 110 and the bushing shaft 111. The axle rod 104 further comprises an outer shell 105 enclosing the axle rod wherein the outer shell 105 of the axle rod 104 forms a fixed section and the axle rod 104 forms a dynamic section of the vehicle's wheel.

The traction system is operated by a hydraulic pump (not shown) which is controlled by the vehicle's electrical system, manually by the driver. The hydraulic pump actuates the hydraulic jacks 107 which are on the fixed section of the vehicle's wheel. Further, one or more reinforcement pipes of jacks 108 are connected to the control valve and the hydraulic pump present in the vehicle. When the hydraulic jacks 107 are powered, the shaft of the hydraulic jack's 116 is projected outside the hydraulic jack 107 thereby increasing a height of the arched piece 109 connected over the shaft of the hydraulic jacks 116. The more the increase in the height of the shaft of the hydraulic jack 116, the more is the increase in the traction of the vehicles wheel. Further when the vehicle starts moving, the bushings 110 on the dynamic section of the wheel come into contact with the arched piece 109. The rotating helm 112 attached to the end of the bushing shaft 111 glides over the arched piece 109 thereby projecting the shaft of the bushing 111 towards the land surface. This increases the traction for the vehicle's movement over the loose soil such as the agricultural farmlands. When the rotating helm is positioned over the arched piece during an operation, the spring 114 gets compressed. The compressed spring 115 pushes the bushing shaft 111 to an initial position once the rotating helm 112 passes over the arched piece 109. The traction system is fixed on the internal surface of the wheel in parallel with the tire 101, thereby making a compact fitting.

Figure 2:
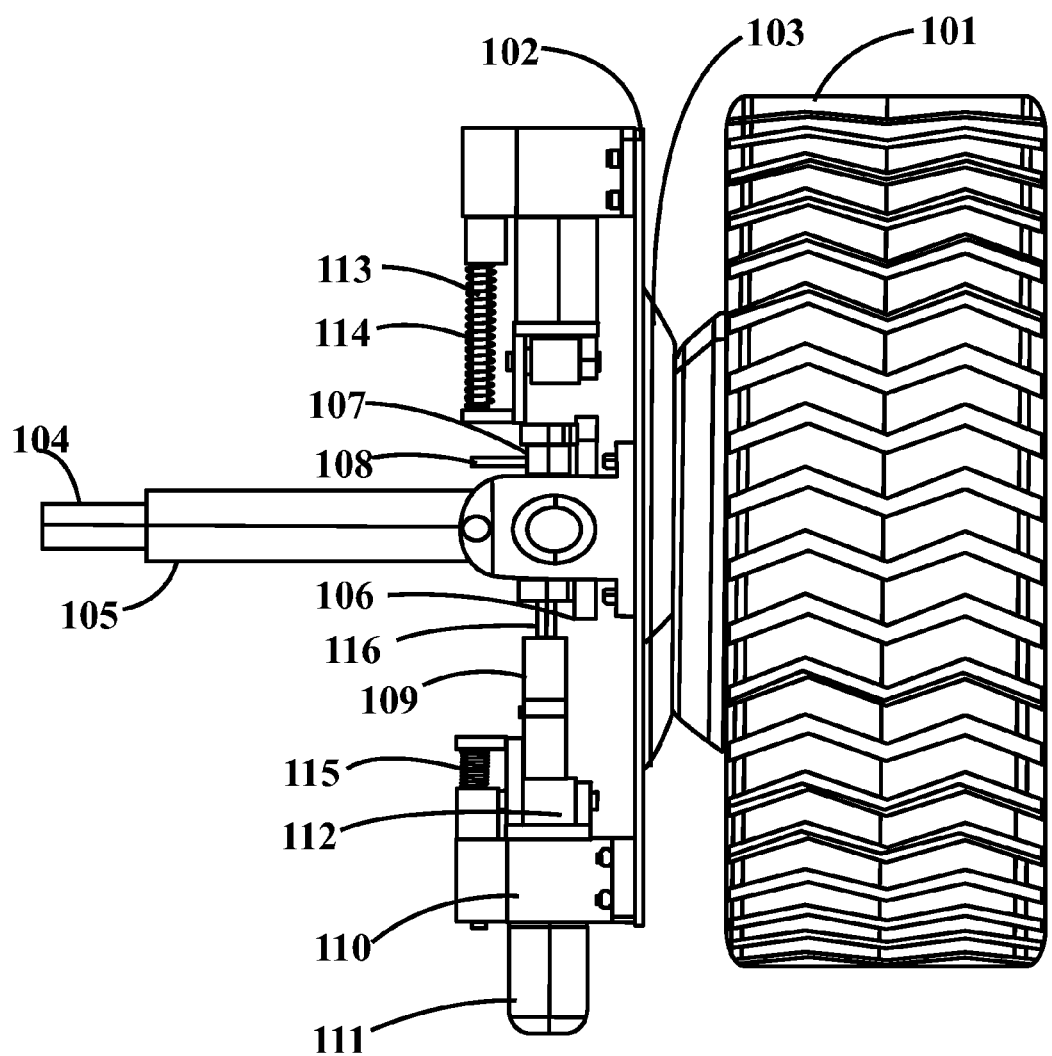
FIG. 2 illustrates a front perspective view a traction system installed in the vehicles according to one embodiment.

With respect to FIG. 2, the traction system is installed internally in parallel to the tire 101 portion of the wheel. The rotating helm 112 which is installed to the end of the bushing shaft 111 maneuvers over the arched piece 109 connected to the shaft of the hydraulic jacks 116. The shaft of hydraulic jacks 116 pushes the bushing shafts 111 externally towards the land surface. This pushes the spring 114 wound on the guide bar between the bushings 110 and the bushing shaft 111 to get into a compressed state. Once the rotating helm 112 completes the rotating process over the arched piece 109, the compressed spring 115 pulls back the bushing shaft 111 to the initial position.

Figure 3:
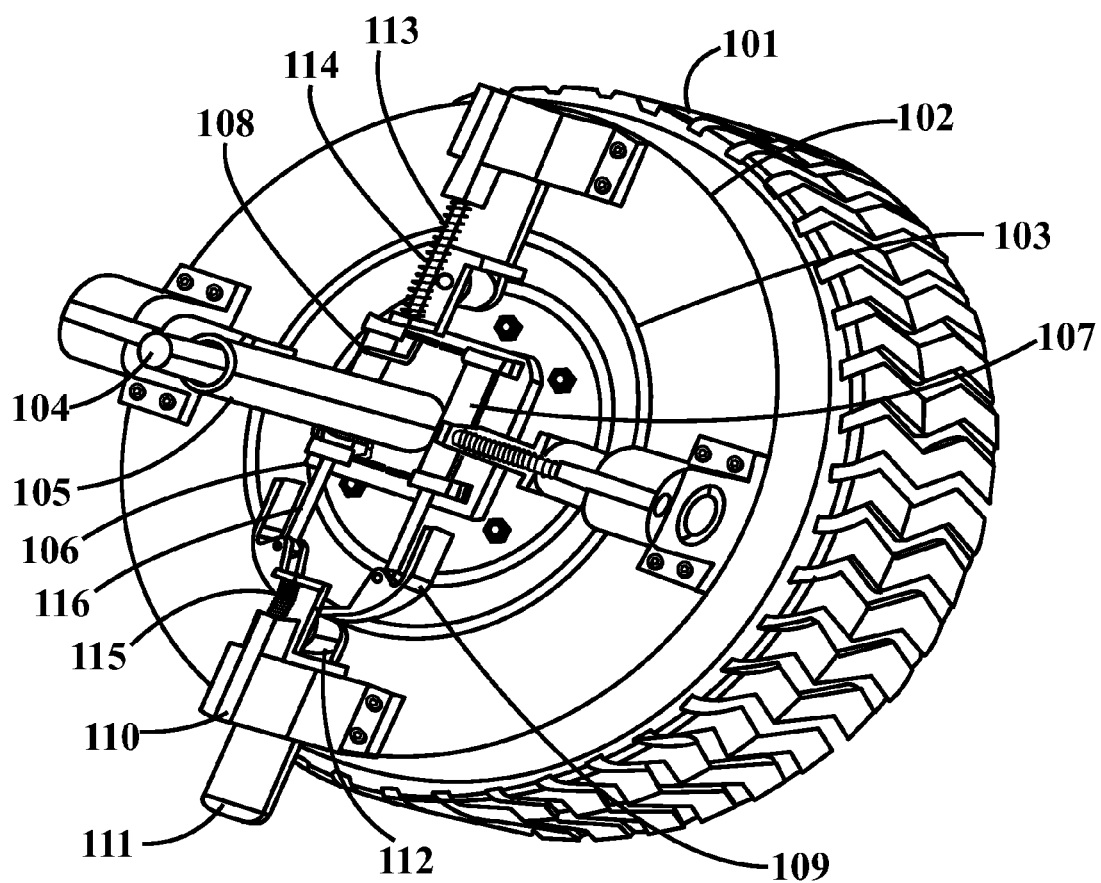
FIG. 3 illustrates a side perspective view of a traction system installed in the vehicles wherein the rotating helm is moved and placed above the arched piece thereby pushing the bushing shaft towards the land surface according to one embodiment.

With respect to FIG. 3, when the vehicle is in motion, the rotating helm 112 which is fastened to the wheel ring 102 starts rotating in conjunction with the vehicle wheel. When the rotating helm 112 maneuvers over the arched piece 109, the bushing shafts 111 are projected towards the land surface thereby providing traction for the vehicles movement. The projection of the bushing shafts compresses the spring 114 over the guide bar 115 and between the bushings and the bushing shaft.

Figure 4:
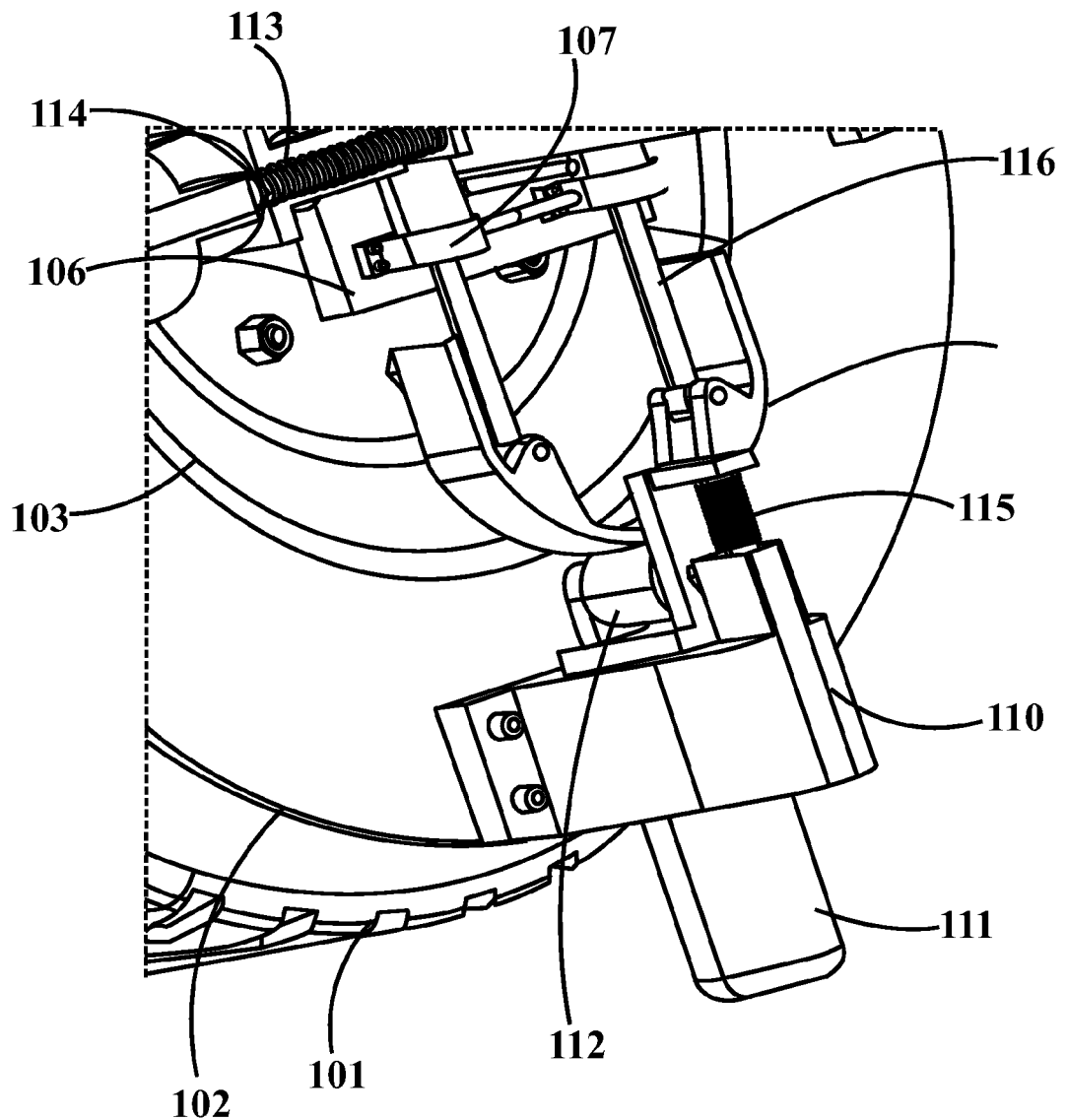
FIG. 4 illustrates a sectional view of a traction system in the vehicles wheel indicating the spring in a compressed condition according to one embodiment.

FIG. 4 illustrates a sectional view of a traction system in the vehicles wheel showing the spring in a compressed condition according to one embodiment. When the rotating helm 112 which is fastened to the wheel ring 102 starts rotating in conjunction with the wheel, the rotating helm 112 maneuvers over the arched piece which is attached to the shaft 116 of the hydraulic jacks 107. Due to the movement of the rotating helm 112 over the arched piece, the spring 114 which is wound over the guide bar 113 arranged between the bushings 110 and the bushing shaft 111 gets compressed and the shaft of the bushings 111 is projected towards the land surface.

Figure 5:
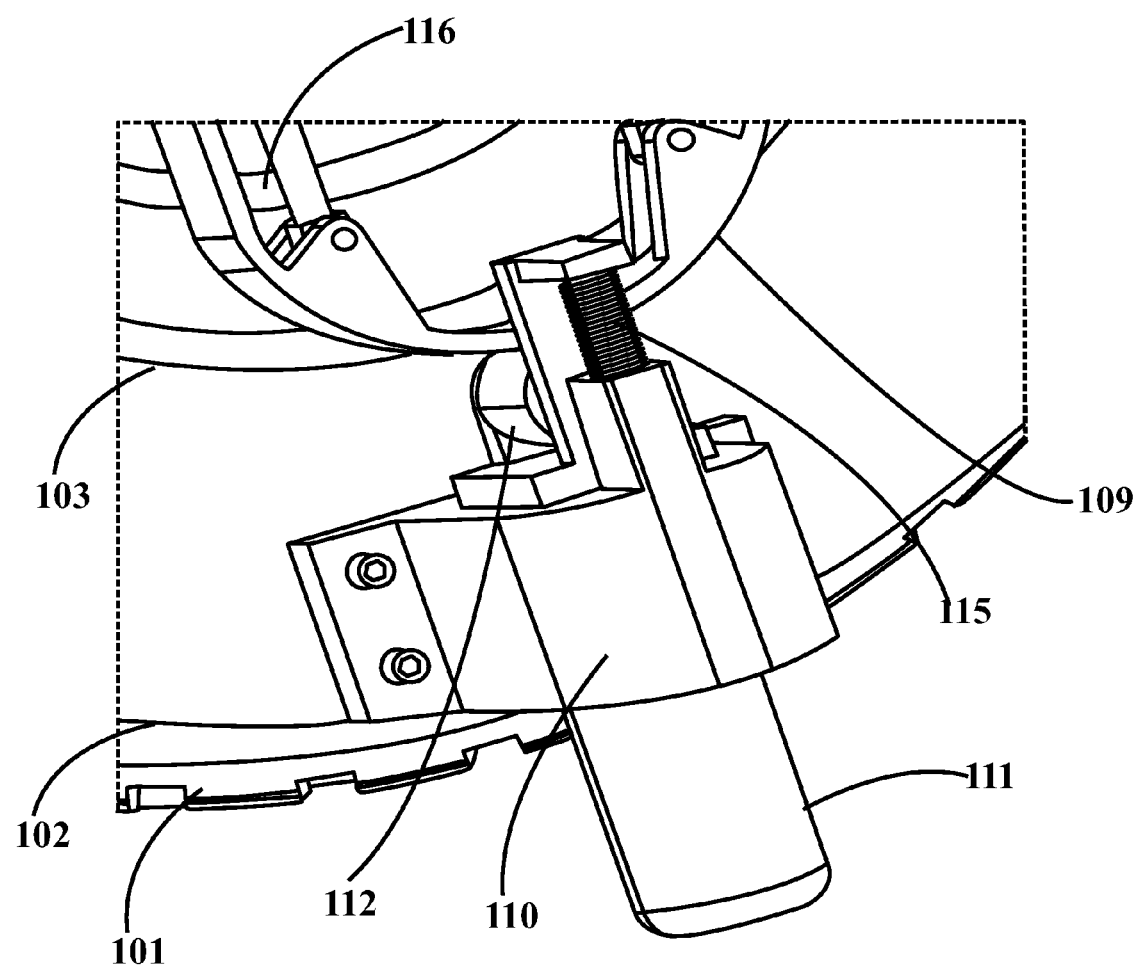
FIG. 5 illustrates a sectional perspective view of a traction system installed in the vehicles wherein the bushing shaft is projected towards the land surface due to the movement of rotating helm over arched piece according to one embodiment.

FIG. 5 illustrates a sectional perspective view of a traction system installed in the vehicles wherein the bushing shaft 111 is projected towards the land surface due to the movement of rotating helm 112, over arched piece 109 the arched piece which is attached to the shaft 116 of the hydraulic jacks 107 according to one embodiment. With respect to FIG. 5, when the rotating helm 112 maneuvers over the arched piece 109, due to the projection of the shaft of the jack 116, the rotating helm 112 which is attached to one end of the bushing shaft 111 pushes the shaft 111 of the bushing 110 towards the land surface thereby providing a desired traction for a movement of the vehicle.

Figure 6:
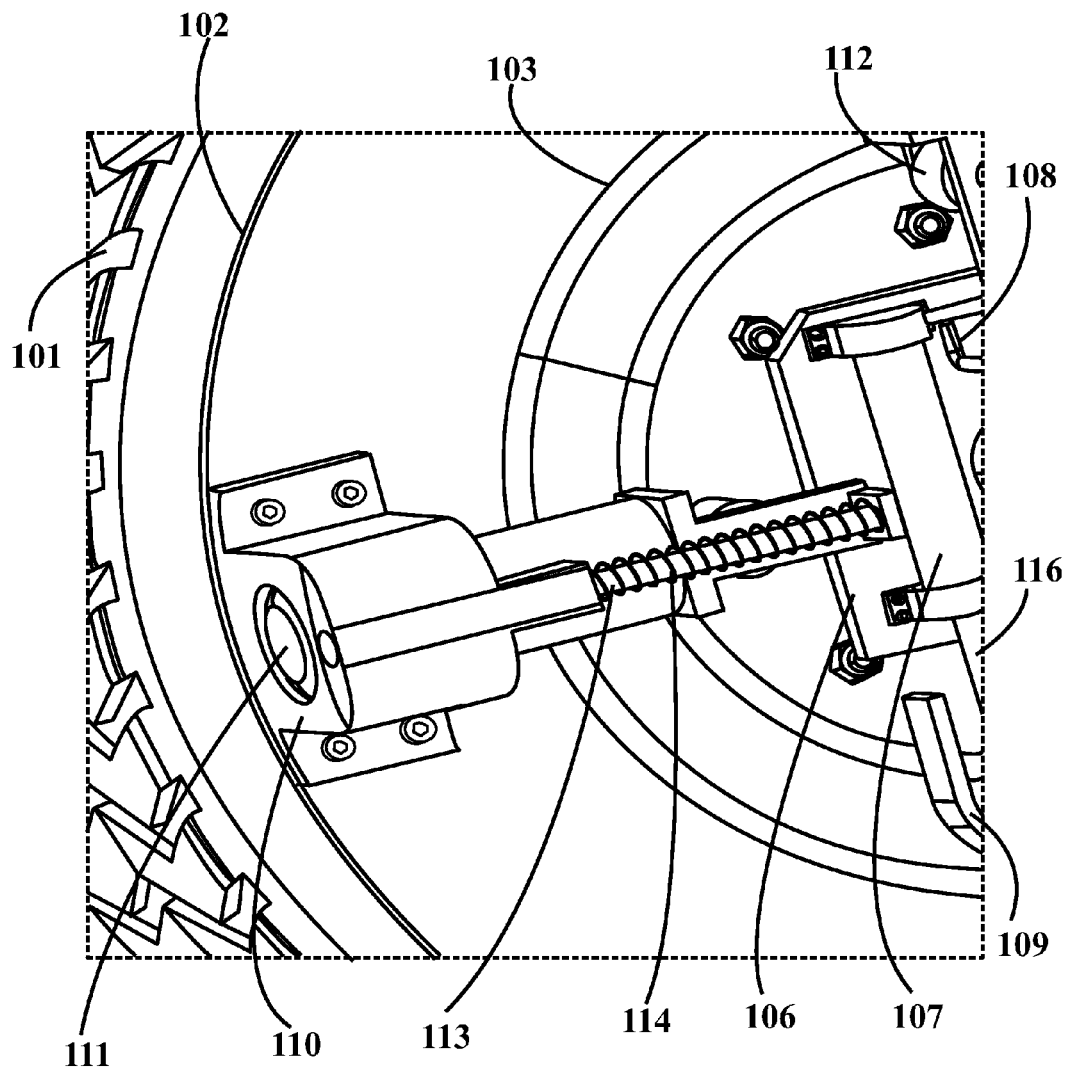
FIG. 6 illustrates a sectional view of the traction system installed in the vehicles wherein the bushing shaft returns back to the initial position once the rotating helm is passed over the arched piece according to one embodiment.

FIG. 6 illustrates a sectional view of a traction system installed in the vehicles wherein the bushing shaft 111 returns back to the initial position once the rotating helm 112 which is fastened to the wheel ring 102, passes over the arched piece 109 which is attached to the shaft 116 of the hydraulic jacks 107 provided with reinforcement pipes 108 according to one embodiment. When the rotating helm 112 completes the maneuvering over the arched piece 109, the compressed spring 115 (as shown in FIG. 5) which is wound over the guide bar 113 arranged between the bushings 110 and the bushing shaft 111, decompresses itself and the bushing shaft 111 comes back to its initial stage inside the bushing 110.

Figure 7:
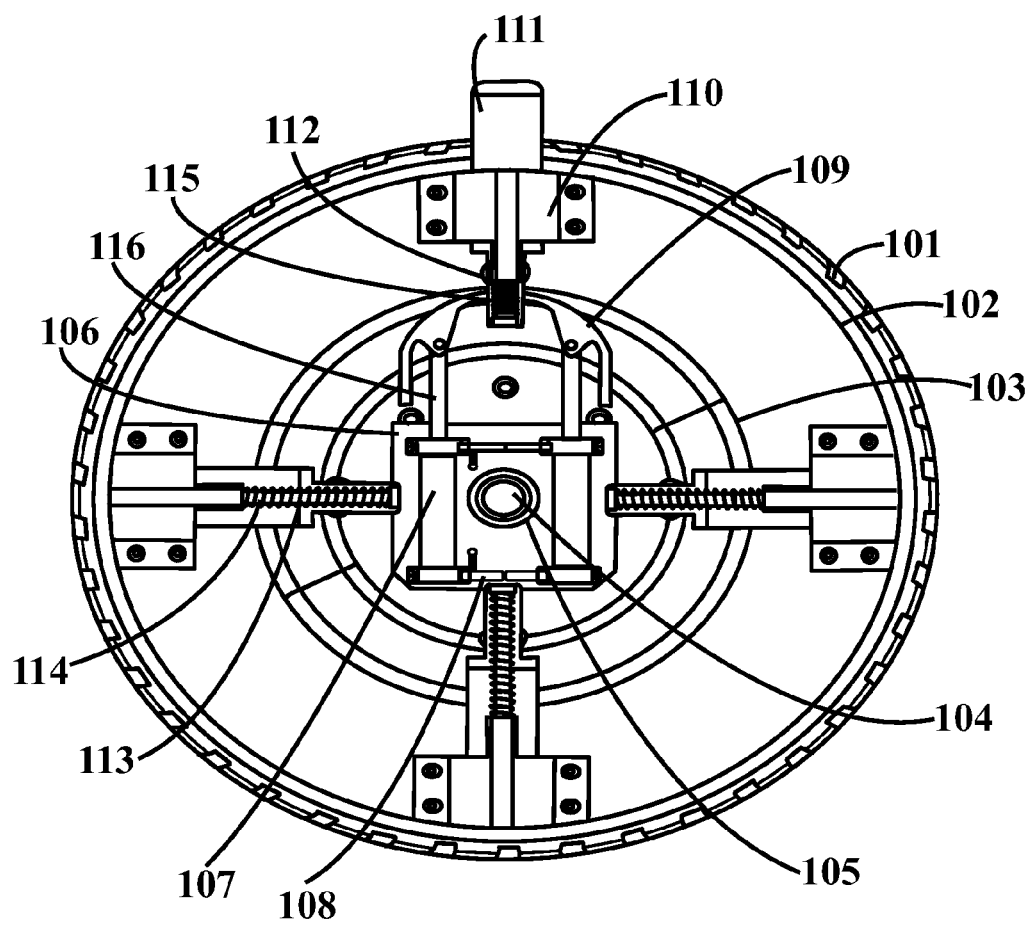
FIG. 7 illustrates a top view of the overall arrangement of the traction system installed in the vehicles according to one embodiment.

FIG. 7 illustrates a top view of the overall arrangement of a traction system installed in the vehicles according to one embodiment. The traction system includes a circular base 103, a board 106 fastened to the circular base 103, an axle rod 104 placed on the board 106, at least two hydraulic jack 107 fastened to the board 103, at least one shaft 116 attached to each of the at least two hydraulic jacks 107 provided with reinforcement pipes 108, an arched piece 109 connected to one of the at least one shaft 116 forming the fixed section of the traction system. A bushing shaft 111 is attached to each of the plurality of bushings 110. A rotating helm 112 is attached to one end of the bushing shaft 111. A guide bar 113 is attached to the bushings 110 and shaft of the bushings 111. A spring 114 is arranged over the guide bar 113 between the bushings 110 and the shaft 111 to form the dynamic section of the traction system.

The traction system for vehicles described herein provides an improved traction for an efficient movement of the vehicles over the loose soil such as the agricultural lands avoiding the idle driving and improving the engines performance. The traction system uses a simple mechanism that comprises the hydraulic jacks and bushings to provide a user with a desired traction. Thus the traction can be controlled dynamically according to a user requirement at a required time.

A controlled friction is created by varying the hydraulic jacks manually through a hydraulic pump connected to the vehicles electric system. This mechanism allows the reduction in the number of wheels to one in the vehicles where two or more wheels are used to improve the traction.

Further this improved traction system eliminates the need for more number of differentials required in improving the traction of the vehicle system. These further causes in reduction in the expenses involved in a production of the wheels and minimize the size of the wheel which provides more traction. Also the elimination of one differential in the double differential vehicles such as front differential in some of the tractors results in a consequent reduction of the expenses involved in the production of wheels and tires.

The improved traction system provides for a reduction in the size and scales in the wheels which results in the reduced production expenses and in minimizing the size of the wheels. Further the vehicle maintenance expenses are also reduced because of the lack of idleness and the minimized erosion of rubber.

Further, the use of chain wheel in some vehicles is eliminated due to the implementation of the regular wheel which provides maximum friction. When the vehicle tire is punctured, the present system provides protection in minimizing the damage to the rubber in the tire. Also the system can be used as an elevator jack to replace a wheel when the wheel is punctured. These overall advantages provide a reduced amount of rubber consumption in the manufacture of wheels thereby conserving an eco friendly environment.

The foregoing description of the embodiments will so fully reveal the general nature of the embodiments herein that others can, by applying current knowledge, readily modify and/or adapt such specific embodiments for various applications without departing from the generic concept, and, therefore, such adaptations and modifications should and are intended to be comprehended within the meaning and range of the equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for reducing friction in vehicles, the system comprising:
   a circular base;
   a board fastened to the circular base;
   an axle rod placed on the board;
   at least two hydraulic jacks fastened to the board;
   at least one shaft attached to each of the at least two hydraulic jacks;
   an arched piece connected to the at least one shaft;
   a wheel ring attached to the axle rod;
   a plurality of bushings fastened to the wheel ring;
   a bushing shaft attached to each of the plurality of bushings;
   a rotating helm attached to one end of the bushing shaft;
   a guide bar attached to the bushings and the bushings shaft; and
   a spring arranged over the guide bar between the bushings and the bushing shaft;
   wherein a movement of a vehicle wheel causes the rotating helm to come into contact with the arched piece which in turn actuates the bushing shaft resulting in a reciprocal movement inside the plurality of bushings thereby providing a traction system between the vehicle wheel and a land surface to generate a maximum friction in a required time and to control a quantity and scale of friction thereby dynamically varying a friction according to a user requirement and wherein the friction is controlled by varying the hydraulic jacks manually through a hydraulic pump.

2. The system according to claim 1, wherein the traction system is installed on an internal side of the vehicle wheel.

3. The system according to claim 1, further comprises a plurality of reinforcement pipes for the at least two hydraulic jacks.

4. The system according to claim 1, further comprising an outer shell enclosing the axle rod and wherein the outer shell forms a fixed section and wherein the axle rod forms a dynamic section of the vehicle wheel.

5. The system according to claim 1, wherein the circular base, the board, the at least two hydraulic jacks, the reinforcement pipe of the at least two hydraulic jacks and the arched piece are arranged on the fixed section of the vehicle wheel.

6. The system according to claim 1, wherein the wheel ring, the bushings, the bushing shaft, the rotating helm, the guide bar and the spring are arranged on the dynamic section of the vehicle wheel.

7. The system according to claim 1, wherein the bushing shaft is arranged vertical or inclined to the land surface.

8. The system according to claim 1, wherein the circular base is connected to a shaft of one hydraulic jack in the at least two hydraulic jacks and the wheel ring.

9. The system according to claim 1, wherein a number of bushing shafts, to which the rotating helm is attached through the guide bar arranged with the spring, is within 4 to 12.

10. The system according to claim 1, wherein the circular base includes a radius which is less than a radius of the vehicle wheel.

11. The system according to claim 1, wherein the board is a base plate for the axle rod and the at least two hydraulic jacks.

12. The system according to claim 1, further comprises at least one hydraulic pump is connected to a vehicle engine to provide power to the at least two hydraulic jacks.

13. The system according to claim 11, wherein the at least one hydraulic pump is controlled by at least one of a vehicle operator or an intelligent system and wherein the vehicle operator manually decides a traction by adjusting a length of the shaft of the hydraulic jacks through the hydraulic pump.

14. The system according to claim 13, wherein the plurality of reinforcement pipes is connected to a control valve and the hydraulic pump.

15. The system according to claim 1, wherein the spring on the guide bar gets uncompressed when the vehicle wheel rotates and the rotating helm crosses the arched piece thereby pulling back the bushing shaft to an original position.

\* \* \* \* \*